US012722111B2

(12) United States Patent
Zanin

(10) Patent No.: US 12,722,111 B2
(45) Date of Patent: Sep. 1, 2026

(54) HAND HELD HAIR APPLIANCE HAVING FILTER GRILL

(71) Applicant: Helen of Troy Limited, St. Michael (BB)

(72) Inventor: Gianni Zanin, Nyack, NY (US)

(73) Assignee: KAZ EUROPE SÀRL, Bussigny (CH)

( * ) Notice: Subject to any disclaimer, the term of this patent is extended or adjusted under 35 U.S.C. 154(b) by 63 days.

(21) Appl. No.: 18/810,022

(22) Filed: Aug. 20, 2024

(65) Prior Publication Data

US 2026/0054208 A1 Feb. 26, 2026

(51) Int. Cl.

| | |
|---|---|
| ***B01D 46/64*** | (2022.01) |
| ***A45D 1/04*** | (2006.01) |
| ***A45D 1/28*** | (2006.01) |
| ***A45D 20/12*** | (2006.01) |
| ***B01D 46/24*** | (2006.01) |

(52) U.S. Cl.

CPC ............... *B01D 46/64* (2022.01); *A45D 1/04* (2013.01); *A45D 1/28* (2013.01); *A45D 20/12* (2013.01); *B01D 46/2403* (2013.01)

(58) Field of Classification Search

CPC ........ A45D 20/12; A45D 20/10; A45D 20/00; A45D 20/122; A45D 20/50; A45D 2/00; A45D 1/04; A45D 2020/128; B01D 46/24; B01D 46/0005; B01D 46/64; B01D 2265/023; B01D 2267/40; B01D 2279/45; B01D 39/12; B01D 46/009; B01D 46/2403; B01D 46/44

See application file for complete search history.

(56) References Cited

U.S. PATENT DOCUMENTS

| | | | | |
|---|---|---|---|---|
| 10,869,529 | B2 | 12/2020 | Chia et al. | |
| 11,653,737 | B1 * | 5/2023 | Higgins | A45D 20/122 34/96 |
| 2007/0238404 | A1 | 10/2007 | Park et al. | |
| 2018/0193786 | A1 | 7/2018 | Imhasly | |
| 2018/0255896 | A1 * | 9/2018 | Chia | A45D 20/12 |
| 2019/0116955 | A1 | 4/2019 | Atkinson | |
| 2023/0166205 | A1 | 6/2023 | Sim et al. | |

FOREIGN PATENT DOCUMENTS

| | | |
|---|---|---|
| JP | S5883905 A | 5/1983 |
| JP | S58180105 A | 10/1983 |

OTHER PUBLICATIONS

International Search Report filed in PCT/US2025/041748 mailed Nov. 2, 2025.

* cited by examiner

*Primary Examiner* — Veronica Martin

(74) *Attorney, Agent, or Firm* — RANKIN, HILL & CLARK LLP

(57) ABSTRACT

A hand held haircare appliance includes a handle for holding the haircare appliance during use. The handle includes a fluid inlet. A filter grill is located on the handle and surrounds the fluid inlet. The filter grill includes a plurality of air holes for the flow of air into the fluid inlet. The filter grill is defined by a first grill part and a second grill part separate and distinct from the first grill part. The first grill part is releasably connected to the handle. The second grill part is releasably connected to the handle independent of the first grill part.

19 Claims, 5 Drawing Sheets

HAND HELD HAIR APPLIANCE HAVING FILTER GRILL

BACKGROUND

In a conventional hair styling appliance, air is drawn into an air inlet by a fan unit and directed towards the hair by an air outlet. Often, one appliance is provided with different attachments, each having a different outlet and thus a different function, for example drying, curling or volumizing. Depending on the style desired, the air may or may not be heated. Conventionally a filter is provided to filter air that enters the air inlet to remove dust and hair.

It is known to provide a multi layered filtering design including, for example, a filter grill having a plurality of air holes and an inner filter for covering the air inlet. Often the filter grill is removable to enable cleaning of the inner filter, or even replacement of the filter grill and/or filter in the event of damage. However, traditional designs often make it difficult to remove the filter grill to clean or replace one of these parts.

SUMMARY

According to one aspect, a hand held haircare appliance comprises a handle for holding the haircare appliance during use. The handle includes a fluid inlet. A filter grill is located on the handle and surrounds the fluid inlet. The filter grill includes a plurality of air holes for the flow of air into the fluid inlet. The filter grill is defined by a first grill part and a second grill part separate and distinct from the first grill part. The first grill part is releasably connected to the handle. The second grill part is releasably connected to the handle independent of the first grill part.

According to the present disclosure, the first grill part is configured to be removable from the handle separately from the second grill part. According to the present disclosure, the first grill part is not connected to the second grill part. According to the present disclosure, a filter is secured to the handle. the filter covers the fluid inlet and at least partially surrounds the at least one control, and the filter grill covers the filter.

According to another aspect, a hand held haircare appliance comprises a handle for holding the haircare appliance during use. The handle includes a fluid inlet. A filter is secured to the handle. The filter covers the fluid inlet. A filter grill is releasably connected to the handle and surrounds the fluid inlet. The filter grill covers the filter. The filter grill includes a plurality of air holes for the flow of air into the fluid inlet and at least one opening. At least one user actuated control for operating the appliance is received in the at least one opening of the filter grill.

DETAILED DESCRIPTION

Figure 1:
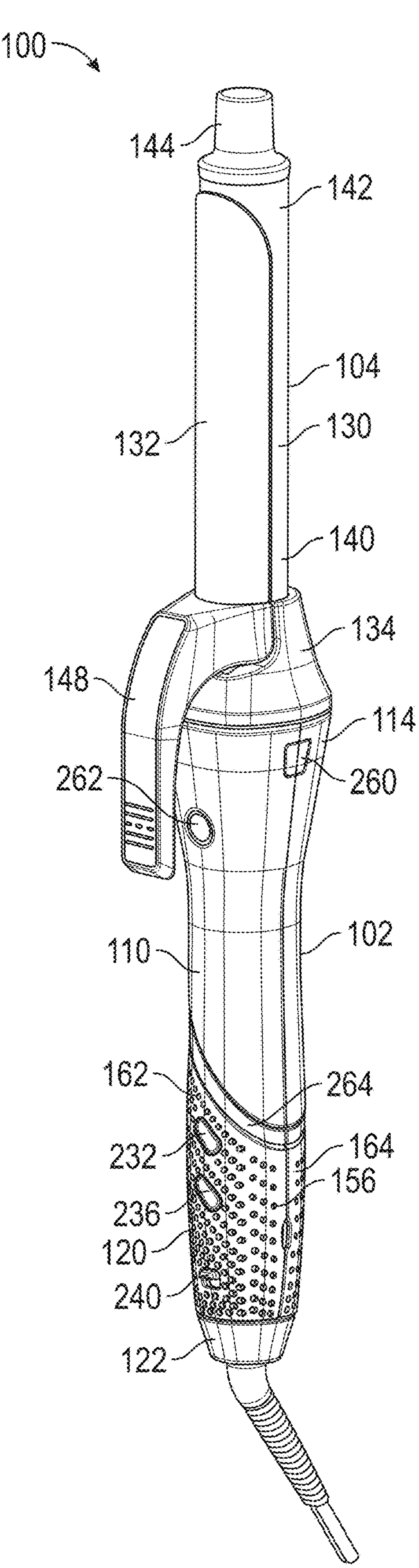
FIG. 1 is a perspective view of a hand held haircare appliance, the appliance including a styling portion and a handle, the handle having a filter grill according to the present disclosure.
Figure 2:
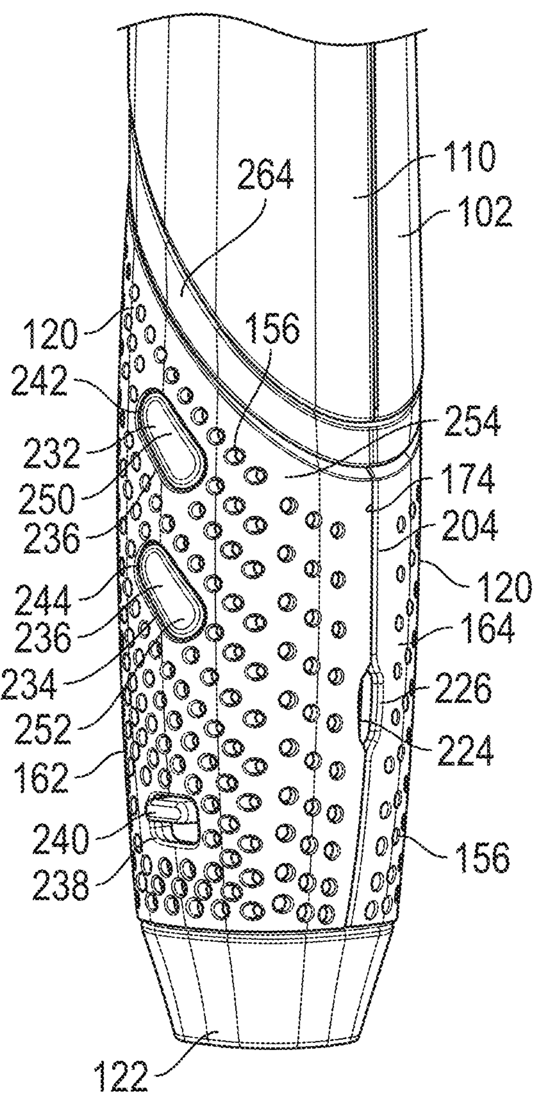
FIG. 2 is an enlarged perspective view of FIG. 1.
Figure 3:
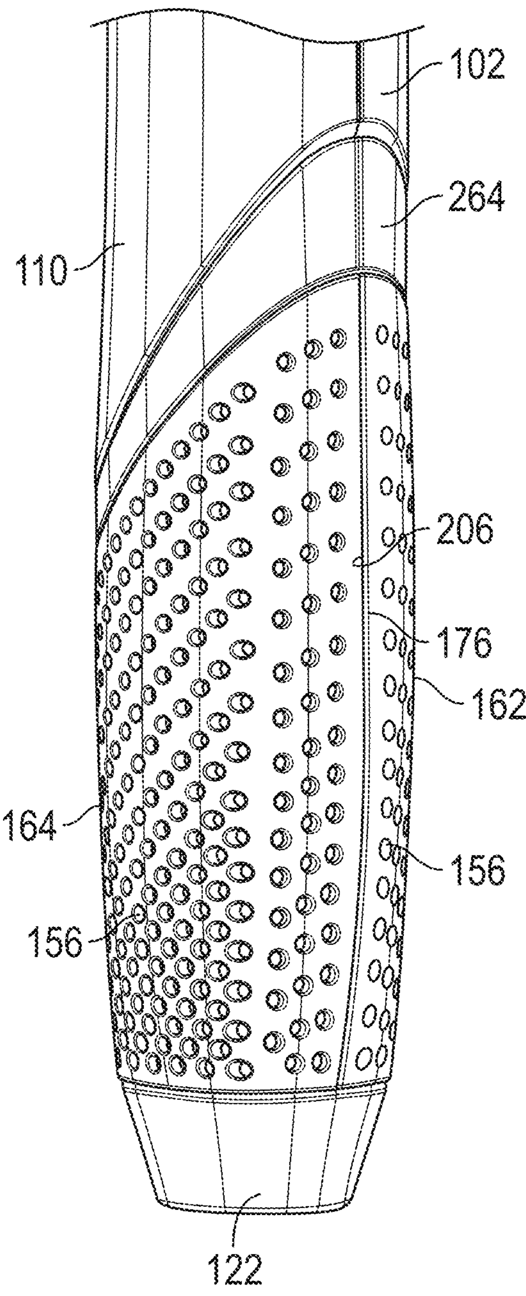
FIG. 3 is an enlarged perspective view of FIG. 1 rotated one hundred eighty degrees.

It should, of course, be understood that the description and drawings herein are merely illustrative and that various modifications and changes can be made in the structures disclosed without departing from the present disclosure. Spatially relative terms, such as "proximal" and "distal", may be used to describe an element and/or feature's relationship to another element(s) and/or feature(s) as, for example, illustrated in the figures. Further, any term of degree used herein, such as "substantially", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Referring now to the drawings, wherein like numerals refer to like parts throughout the several views, FIGS. 1-5 illustrate a hand held haircare appliance or beauty tool 100 with a handle 102 for holding the haircare appliance during use and a styling portion or head 104 connected to handle. The handle 102 can be defined by an outer housing 110 having a first or proximal end portion 112 and second or distal end portion 114. A filter grill 120 is located on the handle 102, for example, at the proximal end portion 112, and the head 104 is coupled to the distal end portion 114. A power cord connector 122 for powering the appliance 100 is coupled to the proximal end portion 112; however, it should be appreciated that the appliance 100 can be powered by, for example, a battery housed in the handle 102. In the depicted aspect, the head 104 is in the form of a curling iron including a barrel 130, a flipper 132 operably associated with the barrel, and an attachment 134 for connection to the distal end portion 114 of the handle 102. The barrel 130 has a first or proximal end portion 140 axially spaced from the handle 102 by the attachment 134 and a second or distal end portion 142. An insulated tip (i.e., a cool tip) 144 can be connected to the distal end portion 142 of the barrel 130, allowing for ease of handling during use of the appliance 100. The flipper 132 includes a lever 148 that is movable from an open position to a closed position for positioning hair against the heated barrel 130.

It should be appreciated that to allow a user to create different hairstyles and to provide the hand held haircare appliance 100 multi-functionality, the head 104 is detachable from the handle 102 to allow for replacement with another detachable head (not shown), for example one including bristles or having a shape different than the curling iron head 104 shown in FIG. 1. Additionally, the head 104 can be removed to allow for easier storage of the appliance 100.

Figure 4:
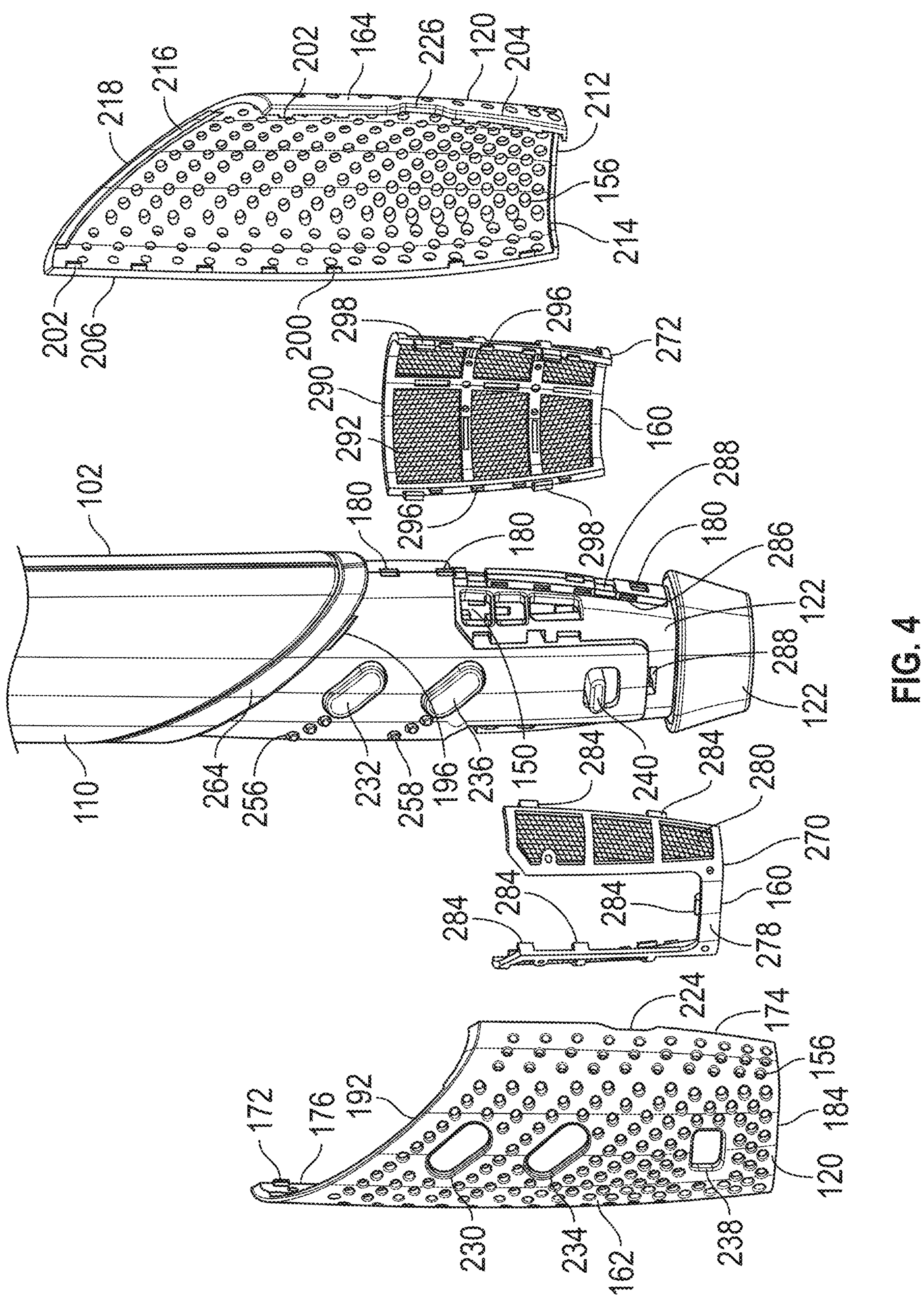
FIG. 4 is an exploded perspective view of FIG. 2.
Figure 5:
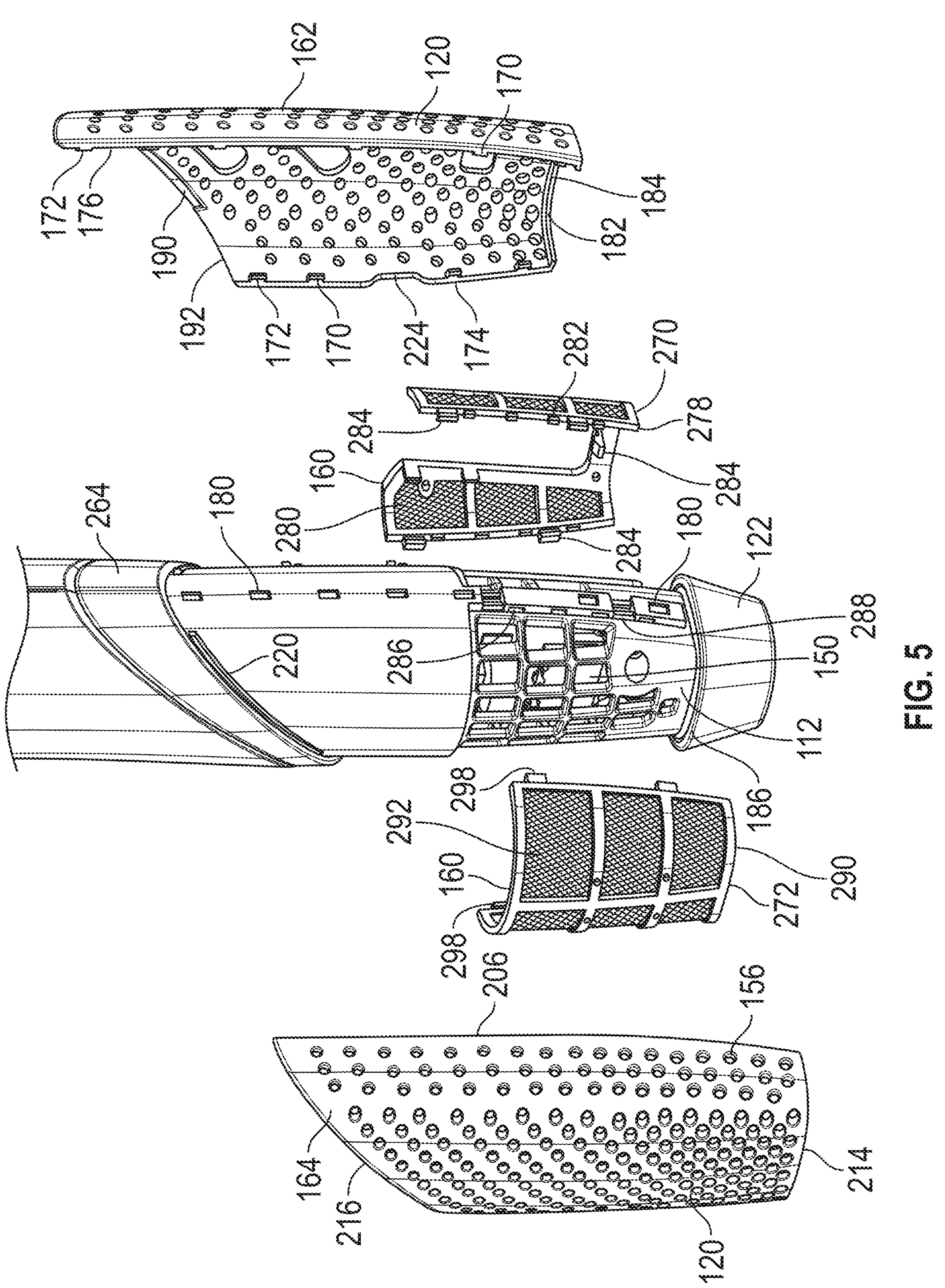
FIG. 5 is an exploded perspective view of FIG. 3.

The hand held haircare appliance 100 is configured to be gripped by a user at the handle 102 and includes a fluid inlet (i.e., an air inlet) 150, for example, at the proximal end portion 112 through which air enters the appliance and flows through the handle 102 and the head 104 to an air outlet (not shown) provided on the head. As shown in FIGS. 4 and 5, the fluid inlet 150 is defined by openings through the proximal end portion 112 of the housing 110 and is longitudinally spaced from the power cord connector 122 relative to the length of the handle 102. The handle 102 is configured to house a fan driven by a motor, the fan drawing air in through the fluid inlet 150 and pushing the air through a heater which optionally heats the air and toward the air outlet. The filter grill 120 includes a plurality of air holes 156 that allow for the air to flow into the fluid inlet 150. The air holes 156 are sized and positioned to allow optimal airflow into the fluid inlet 150 while preventing larger debris or hair from entering the appliance. The size and pattern of these air holes 156 may vary, but they should be small enough to provide protection without significantly restricting airflow. The handle 102 and the filter grill 120 may have a substantially cylindrical shape for improved ergonomics and aesthetic appeal. A filter 160 (i.e., a framed filter mesh) lies internal of the filter grill 120 and covers the fluid inlet 150.

The filter grill 120 is a removable article that surrounds the fluid inlet 150. When the filter grill 120 is removed it enables the filter 160 to be accessed for cleaning. If the filter grill 120 is damaged, the appliance 100 will still function and the damaged filter grill can be easily replaced with a new one. To this end, the filter grill 120 is defined by and provided in two parts, a first grill part 162 and a second grill part 164. The first and second grill parts 162, 164 are separate and distinct from each other. The first grill part 162 is releasably connected to the proximal end portion 112 of the housing 110 of the handle 102, and the second grill part 164 is releasably connected to the proximal end portion of the handle housing independent of the first grill part. Therefore, because the first grill part 162 is configured to be removable from the proximal end portion 112 of the handle 102 separately from the second grill part 164, the first grill part is not connected to the second grill part. This allows for the selective cleaning of the filter 160 beneath the filter grill 120 and also allows for the first and second grill parts 162, 164 to be separately replaced if damaged.

With reference to FIGS. 4 and 5, the first grill part 162 includes a first connector 170 for mounting the first grill part to the proximal end portion 112 of the housing 110 of the handle 102. In one embodiment, the first connector 170 comprises spaced protrusions or tabs 172 that are provided along side edge portions 174, 176 of the first grill part. The tabs 172 are received (in a friction-fit manner) in corresponding spaced apertures 180 formed in the proximal end portion 112 of housing 110. The first grill part 162 further includes a flange 182 at a proximal edge portion 184 of the first grill part that is seated on an edge portion 188 of the power cord connector 122, and includes a recess 190 at a distal edge portion 192 of the first grill part that receives a connector or tab 196 provided on the housing 110 of the handle 102.

Similarly, the second grill part 164 includes a second connector 200 for mounting the second grill part to the proximal end portion 112 of the housing 110 of the handle 102. In one embodiment, the second connector 200 comprises spaced protrusions or tabs 202 that are provided along side edge portions 204, 206 of the first grill part. The tabs 202 are received (in a friction-fit manner) in the same corresponding spaced apertures 180 formed in the proximal end portion 112 of housing 110; however separate apertures for the tabs 202 can be provided in the proximal end portion. The second grill part 164 further includes a flange 212 at a proximal edge portion 214 of the second grill part that is seated on the edge portion 188 of the power cord connector 122, and includes a recess 216 at a distal edge portion 218 of the second grill part that receives a connector or tab 220 provided on the housing 110 of the handle 102.

Therefore, according to the present disclosure, each grill part 162, 164 has its own attachment manner for connecting to the housing 110 of the handle 102. The first grill part 162 has the first connector 170, while the second grill part 164 has the second connector 200. These connectors 170, 200 are designed to allow each grill part 162, 164 to be independently attached to and removed from the proximal end portion 112 of the handle housing 110. The first connector 170 includes the spaced tabs 172 that fit into the corresponding apertures 180 in the housing 110, and the second connector 200 includes the spaced tabs 202 that fit in the same apertures 180. This design allows for the side edge portions 174 and 176 of the first grill part 162 to abut the respective side edge portions 204 and 206 of the second grill part 162 when the filter grill 120 is assembled on proximal end portion 112 of the housing. This design also allows for a secure connection that can still be easily released when needed. It should be appreciated that alternative configurations of the first and second connectors 170 and 200 are contemplated, for example, a snap-fit design.

The two-part design of the filter grill 120 significantly enhances the maintainability of the appliance 100. Each grill part 162 and 164 can be removed independently, allowing for thorough cleaning of both the filter grill 120 itself and the underlying filter 160. This feature helps to ensure consistent performance and longevity of the appliance 100. To assist in the removal of each grill part from the housing 110, the side edge portions 174, 204 of the respective first and second grill parts 162, 164 can include notches 224, 226.

At least one of the first and second grill parts 162 and 164 may include one or more openings designed to accommodate user-actuated controls, such as a button, switch, or other interface element. These controls could include power buttons, heat and temperature settings, and/or airflow adjustments. The openings are precisely sized and positioned to allow these controls to protrude through the one grill part or sit flush with its outer surface. More specifically, and according to one aspect, the first grill part 162 includes a first opening 230 for a first user-actuated control 232, a second opening 234 for a second user-actuated control 236, and a third opening 238 for a third user-actuated control 240. The first and second user-actuated controls 232, 236 can be elongated, substantially obround, controls for heat and temperature settings and airflow adjustments, and the third user-actuated control 240 can be a power/kill switch. The first and second openings 230, 234 are therefore correspondingly sized and shaped, such that respective edge portions 242, 244 of the first grill part 162 that define the respective first and second openings 230, 234 are immediately adjacent edge portions of the first and second user-actuated controls 232, 236. Further, the first and second user-actuated controls 232, 236 are sized such that an exterior face 250, 252 of each first and second user-actuated control 232, 236 is substantially flush with an outer surface 254 of the first grill part 162. Some embodiments may also incorporate indicator lights 256 and 258 for the respective first and second user-actuated control 232 and 236 into the filter grill design. These indicator lights 256 and 258 are visible through specific air holes 156 adjacent to the first and second user-actuated control, providing user feedback on power status, heat levels, or other functions. The third opening 238 is also sized to correspond to the shape of the third user-actuated control 240. It should be appreciated, however, that the appliance 100 may be provided with more or less than the depicted user-actuated controls that are received by the filter grill 120. It should also be appreciated that the shape and size of the depicted user-actuated controls can differ and that the openings in the filter grill will be correspondingly shaped. Further provided on the appliance 100 are an attachment release 260 for detaching the head 104 from the distal end portion 114 of the handle 102 and a cool shot button 262 (see FIG. 1). An illuminated part 264 can be provided between the filter grill 120 and the housing 110 for aesthetic appeal and for indicating that the appliance 100 is powered on.

With reference to FIGS. 4 and 5, the filter 160 beneath the filter grill 120 includes a first filter part 270 and a second filter part 272, with the first grill part 162 of the filter grill 120 covering the first filter part and the second grill part 164 of the filter grill covering the second filter part. Similar to the filter grill 120, the first and second filter parts 270 and 272 are separate and distinct from each other. The first filter part 270 is connected to the proximal end portion 112 of the housing 110 of the handle 102, and the second filter part 272 is connected to the proximal end portion of the handle housing 110 independent of the first grill part 270.

The first filter part 270 includes a frame 278 for securing a mesh 280 that covers the fluid inlet 150. According to one embodiment, the frame 278 includes at least one alignment tab 282 and at least one connector 284. The at least one alignment tab 282 is received in at least one first opening 286 in the housing 110, and the at least one connector 284 is received is secured in at least one second opening 288 in the housing 110. With the user-actuated controls received by the first grill part 162, the first filter part 270 is configured to at least partially surround the user-actuated controls. The second filter part 272 includes a frame 290 for securing a mesh 292 that covers the fluid inlet 150. Similar to the frame 278, the frame 290 includes at least one alignment tab 296 and at least one connector 298. The at least one alignment tab 296 is received in the at least one first aperture 286 in the housing 110, and the at least one connector 298 is received is secured in the at least one second aperture 288 in the housing 110.

As is evident from the foregoing, the present disclosure relates to the hand held haircare appliance 100 with an improved filter grill design. The appliance 100 comprises the handle 102 with the fluid inlet 150. As depicted, the fluid inlet 150 is at the proximal end portion 112 of the handle; however, the fluid inlet can be positioned at other locations along the length of the handle 102. The filter grill 120 surrounds the fluid inlet 150 and covers the filter 160. The filter grill 20 includes multiple air holes 156 for airflow and is defined by two separate and distinct filter parts 162, 164 that can be independently attached to and removed from the handle 102. This design allows for easier cleaning, maintenance, and replacement of the filter grill parts and the filter parts 270, 272. The filter grill 120 may include openings 230, 234, 238 for user-actuated controls 232, 236, 240. The handle 102 and filter grill 120 have a substantially cylindrical shape for ergonomic use. The two-part design of the filter grill 120 allows for differing visual effects, such as contrasting colors or textures between the two grill parts 162, 164.

As mentioned, the two-part filter 160 is secured beneath the filter grill 120. The filter grill 120 complements this filter 160 by allowing access to different sections of the filter. The first grill part 162 covers the first filter part 270, while the second grill part 164 covers the second filter part 272. This configuration allows for more targeted maintenance and replacement of filter components if needed. Accordingly, the filter grill 120 significantly enhances the functionality, usability, and maintainability of the hand held haircare appliance 100. The configuration of the filter grill 120 allows for easy removal of either grill part 162, 164 for cleaning or replacement, improving the maintainability and longevity of the appliance 100. The separate grill parts 162, 164 also allow for more flexible placement of the user-actuated controls and corresponding indicator lights, enhancing the user interface of the appliance 100.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hand held haircare appliance comprising:
a handle for holding the haircare appliance during use, the handle including a fluid inlet; and
a filter grill located on the handle, the filter grill surrounding the fluid inlet, the filter grill including a plurality of air holes for flow of air into the fluid inlet,
wherein the filter grill is defined by a first grill part and a second grill part separate and distinct from the first grill part, the first grill part releasably connected to the handle, the second grill part releasably connected to the handle independent of the first grill part,
wherein the first grill part includes a first connector for mounting the first grill part to the handle, and the second grill part includes a second connector for mounting the second grill part to the handle
wherein the first grill part is configured to be removable from the handle separately from the second grill part, and the second grill part is configured to remain attached to the handle via connection of the second connector to the handle after removal of the first grill part.

2. The hand held haircare appliance of claim 1, wherein the first grill part is not connected to the second grill part.

3. The hand held haircare appliance of claim 1, wherein the first connector includes spaced tabs that are received in corresponding spaced apertures formed in the handle.

4. The hand held haircare appliance of claim 1, wherein at least one of the first grill part and the second grill part includes at least one opening, and further including at least one user actuated control for operating the appliance, the at least one control received in the at least one opening.

5. The hand held haircare appliance of claim 4, wherein the at least one control includes at least one indicator light received in at least one air hole of the plurality of air holes.

6. The hand held haircare appliance of claim 4, wherein a filter is secured to the handle, the filter covering the fluid inlet and at least partially surrounding the at least one control, the filter grill covering the filter.

7. The hand held haircare appliance of claim 6, wherein the filter includes a first filter part and a second filter part, the first grill part covering the first filter part and the second grill part covering the second filter part.

8. The hand held haircare appliance of claim 1, wherein a power cord connector extends from an end portion of the handle, the fluid inlet is longitudinally spaced from the power cord connector relative to a length of the handle.

9. The hand held haircare appliance of claim 1, wherein the handle and the filter grill are substantially cylindrical.

10. The hand held haircare appliance of claim 1, wherein the fluid inlet is located at an end portion of the handle, the filter grill is located at the end portion of the handle, and each of the first grill part and the second grill part is releasably connected to the end portion of the handle.

11. A hand held haircare appliance comprising:
a handle for holding the haircare appliance during use, the handle including a fluid inlet;
a filter is secured to the handle, the filter covering the fluid inlet;
a filter grill is releasably connected to the handle, the filter grill surrounding the fluid inlet and covering the filter, the filter grill including a plurality of air holes for flow of air into the fluid inlet and at least one opening, the at least one opening encircled by the plurality of air holes; and at least one user actuated control for operating the appliance is received in the at least one opening of the filter grill.

12. The hand held haircare appliance of claim 11, wherein the filter grill is defined by a first grill part and a second grill part separate and distinct from the first grill part.

13. The hand held haircare appliance of claim 12, wherein the first grill part is releasably connected to the handle, and the second grill part releasably connected to the handle independent of the first grill part.

14. The hand held haircare appliance of claim 13, wherein the first grill part is configured to be removable from the handle separately from the second grill part.

15. The hand held haircare appliance of claim 14, wherein the first grill part is not connected to the second grill part.

16. The hand held haircare appliance of claim 11, wherein the fluid inlet is located at an end portion of the handle, the filter grill is releasably connected to the end portion of the handle, and the at least one user actuated control is located at the end portion of the handle.

17. A hand held haircare appliance comprising:

a handle for holding the hand held haircare appliance during use, the handle including a fluid inlet; and a filter grill located on the handle, the filter grill surrounding the fluid inlet, the filter grill including a plurality of air holes for flow of air into the fluid inlet, wherein the filter grill is defined by a first grill part and a second grill part separate and distinct from the first grill part, the first grill part releasably connected to the handle, the second grill part releasably connected to the handle independent of the first grill part, wherein the first grill part is configured to be removable from the handle separately from the second grill part, and the first grill part is not connected to the second grill part.

18. The hand held haircare appliance of claim 17, wherein the first grill part includes a first connector for mounting the first grill part to the handle, and the second grill part includes a second connector for mounting the second grill part to the handle.

19. The hand held haircare appliance of claim 17, wherein the filter grill includes the plurality of air holes for flow of air into the fluid inlet and at least one opening separate and distinct from the plurality of air holes, the at least one opening receiving at least one user actuated control for operating the hand held haircare appliance.

* * * * *